(12) United States Patent
D'Andrea

(10) Patent No.: US 8,678,198 B1
(45) Date of Patent: Mar. 25, 2014

(54) MATERIAL DISPENSER FOR FINE PARTICLES

(76) Inventor: Diane D'Andrea, Palatine, IL (US)

( * ) Notice: Subject to any disclaimer, the term of this patent is extended or adjusted under 35 U.S.C. 154(b) by 185 days.

(21) Appl. No.: 13/191,651

(22) Filed: Jul. 27, 2011

(51) Int. Cl.
*B07B 1/02* (2006.01)

(52) U.S. Cl.
USPC . 209/417; 209/418; 222/189.02; 222/189.03; 222/191; 73/426; 73/427

(58) Field of Classification Search
USPC ........ 209/417, 418; 222/189.02, 189.03, 191; 73/426, 427; D10/46.2
See application file for complete search history.

(56) References Cited

U.S. PATENT DOCUMENTS

| | | | | |
|---|---|---|---|---|
| 2,326,762 A * | 8/1943 | Collier | | 209/357 |
| 2,799,086 A * | 7/1957 | Tupper | | 30/142 |
| 4,534,858 A * | 8/1985 | Aldrich et al. | | 209/236 |
| 6,125,699 A * | 10/2000 | Molenaar | | 73/429 |
| 6,928,682 B1 | 8/2005 | Hahn | | |
| 6,928,870 B1 * | 8/2005 | Liebowitz | | 73/426 |
| 7,077,054 B1 * | 7/2006 | Hurlock | | 99/323 |
| D551,522 S * | 9/2007 | Taylor et al. | | D7/667 |
| 2002/0079339 A1 | 6/2002 | Sheffler et al. | | |
| 2005/0172819 A1 * | 8/2005 | Chen et al. | | 99/279 |

\* cited by examiner

*Primary Examiner* — Terrell Matthews
(74) *Attorney, Agent, or Firm* — Grace J. Fishel

(57) ABSTRACT

A measuring cup or measuring spoon, the bottom of which has a plurality of openings through which particles can be sifted and a top edge of which has a tab that when tapped allows a user to control the pattern that the particles are sifted.

10 Claims, 5 Drawing Sheets

MATERIAL DISPENSER FOR FINE PARTICLES

BACKGROUND OF THE INVENTION

1. Field of the Invention

The present invention relates to a dispenser capable of sifting various quantities of material in a controlled manner 2. Brief Description of the Prior Art Some cooking procedures call for sifting baking powder, cream of tartar, baking soda, flour, corn meal and the like into the recipe or onto a cooking surface. The process usually involves measuring the material with a measuring cup or measuring spoon and imprecise shaking of the product into the recipe or onto the designated surface. For the addition of a "pinch" of salt or a "dash" of spice, a cook may put his or her fingers in the spice container, which is unsanitary, and finger application also results in uneven sprinkling. What is needed is a measuring cup or measuring spoon that can be used for measuring particulate materials and for sifting them in a controlled manner.

BRIEF SUMMARY OF THE INVENTION

In view of the above, it is an object of the present invention to provide a cup or spoon that may double as a true measurer and that can be used to sift materials in a controlled manner. Other objects and features of the invention will be in part apparent and in part pointed out hereinafter.

In accordance with the invention, a material dispenser such as a measuring spoon or a measuring cup is provided for sifting quantities of material in a controlled manner. The material dispenser has a sifter body attached to a handle. The sifter body has a bottom with openings designed to distribute particulate materials placed in the sifter body and a tab at a top edge. The material dispenser distributes particulate materials placed in the sifter body through the openings in the bottom of the sifter body more or less evenly over a designated surface when tapped on the tab by a user. When the handle includes a collar into which the sifter body can be snapped in and popped out, a plurality of sifter bodies with different sized openings may be provided. This permits a dispenser with appropriate sized openings to be selected depending on the material being sifted. While the focus is on measuring and sifting consumables, the material dispenser can be used for other purposes, such as sprinkling glitter on an art project and so forth.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 10:
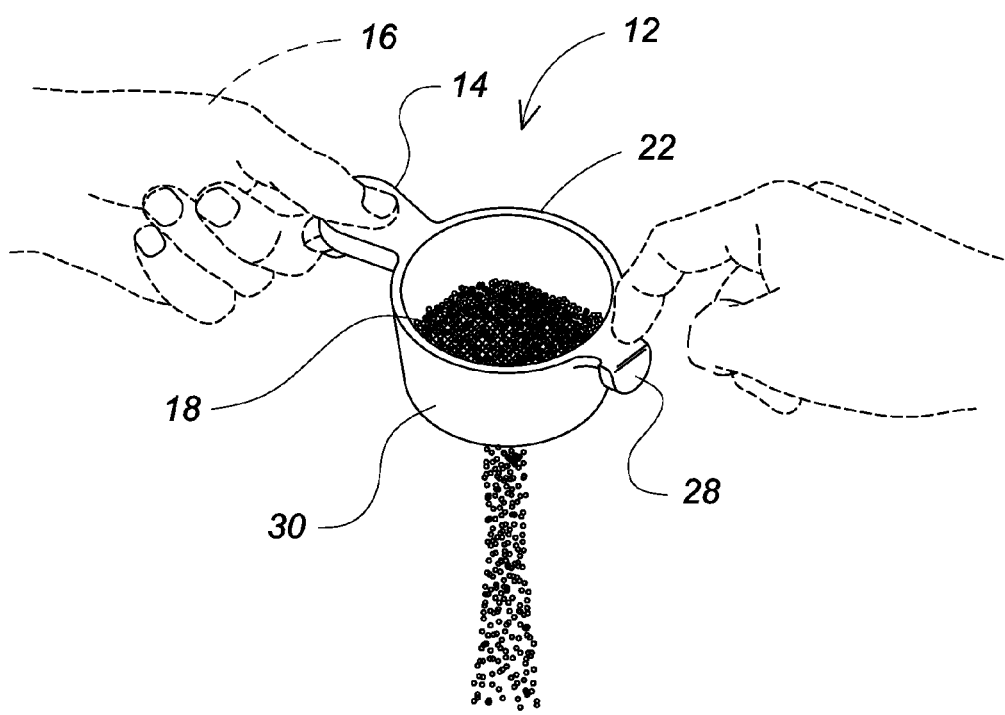
FIG. 10 is perspective view of a cup with a sifter body and tab in accordance with the present invention.

Referring to the drawings more particularly by reference character, reference character 10 refers to a material dispenser in accordance with the present invention in the form of a measuring spoon, as shown in FIGS. 1-9, and a measuring cup 12 as shown in FIG. 10.

Figure 1:
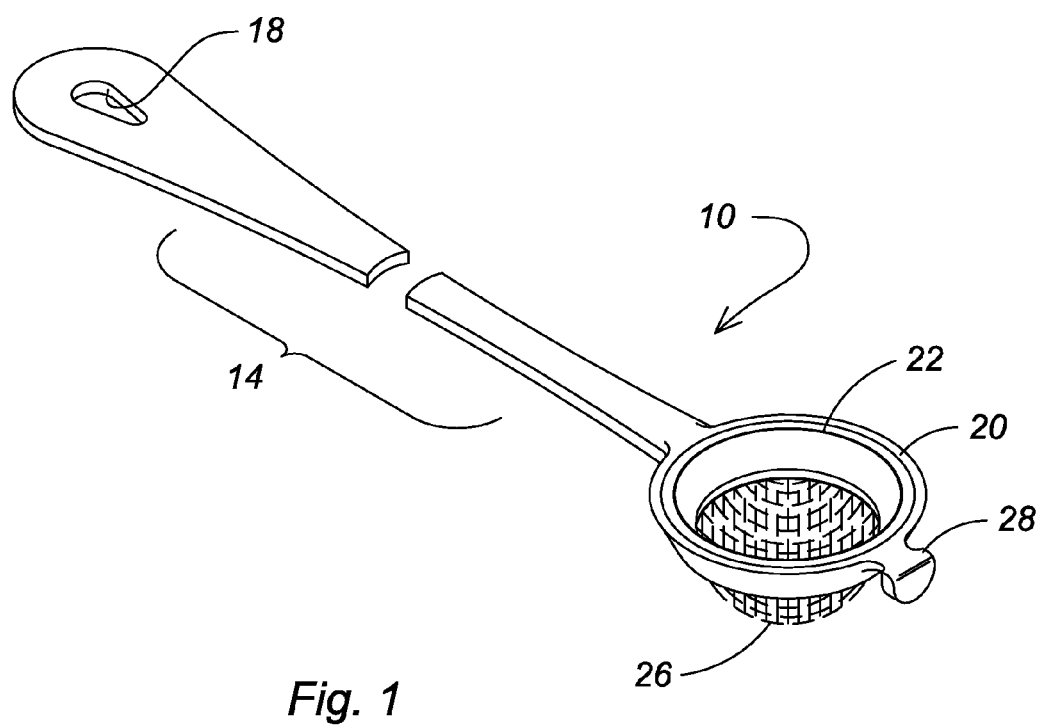
FIG. 1 is a perspective view of a spoon in accordance with the present invention with a sifter body seated in a collar of a handle.
Figure 2:
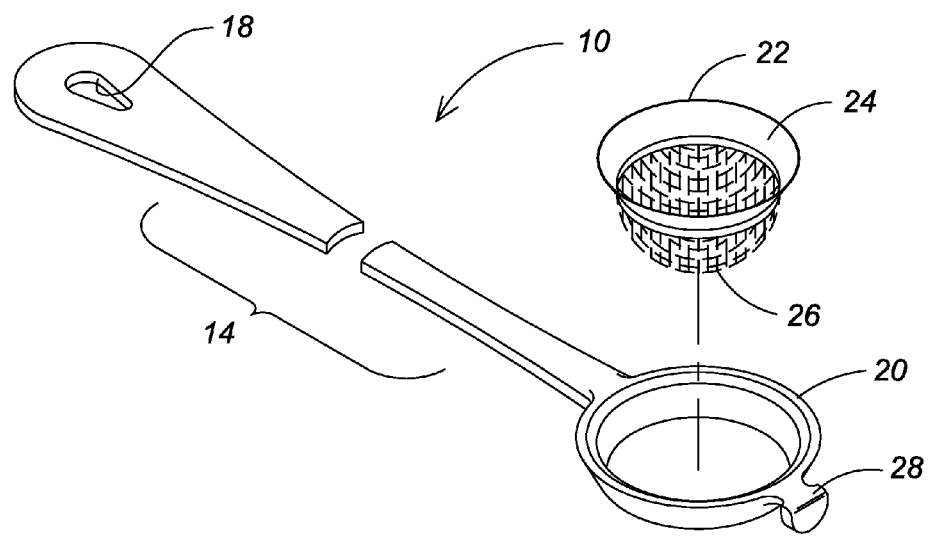
FIG. 2 is perspective view of the spoon with a sifter body popped out of the collar in the handle.
Figure 3:
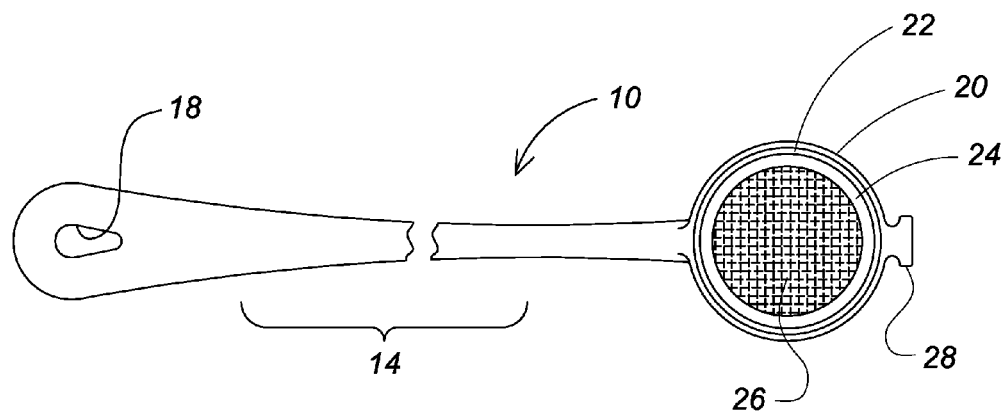
FIG. 3 is top plan view of the spoon.
Figure 4:
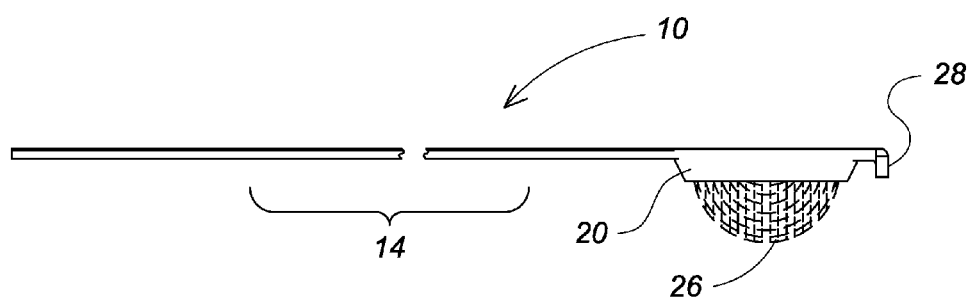
FIG. 4 is a side elevation of the spoon.
Figure 5:
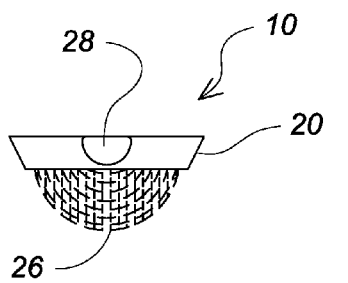
FIG. 5 is front end view of the spoon.
Figure 6:
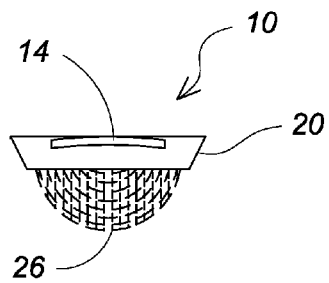
FIG. 6 is a back end view of the spoon.
Figure 7:
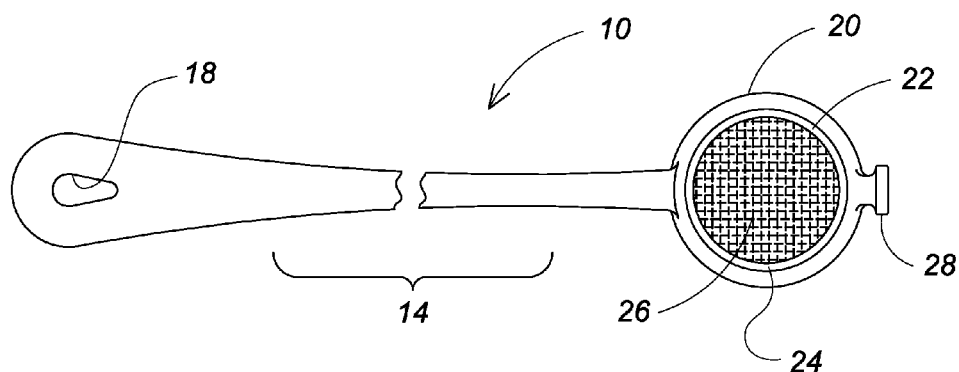
FIG. 7 is a bottom plan view of the spoon.

Beginning with FIGS. 1-9, spoon 10 has a handle 14 with a first end configured to be grasped by a user's hand 16. Handle 14 is preferably long enough to reach into larger spice jars, for which purpose handle may be 5 inches or more long. First end may include an aperture 18 for hanging the tool on a hook. As best seen in FIG. 2, a second end of handle 14 terminate in a collar 20 into which may be seated a sifter body 22. As shown in FIGS. 1-9, sifter body 22 is an open ended, perforated container with a ring portion 24 (rolled edge, frustoconical section or the like) about its open end by which it is supported in collar 20. In some embodiments, sifter body 22 and collar 20 may be integrally formed and sifter body 22 not removable.

With continuing reference to FIGS. 1-9, sifter body 22 is circular in plan but it may have other shapes including, square, rectangular, oval, polygonal and so forth so long as sifter body 22 matches the shape and form of collar 20. A rectangular or oval shape may be preferred in some instances for the purpose of slipping into small spice jars. Perforated container may be formed of mesh or with a plurality of narrow slits or an array of holes, the shape and size being suitable to the application for which dispenser is to be used.

A set of spoons 10 may be provided when sifter body 22 is not detachable, ranging from ⅛ teaspoon to 1 tablespoon with the perforation size increasing with increasing spoon size, or not. When sifter body 22 is detachable from handle 14, sifter bodies that snap into place and pop out of collar 20 easily may be provided with different mesh bowls 26 that vary in mesh size.

Figure 8:
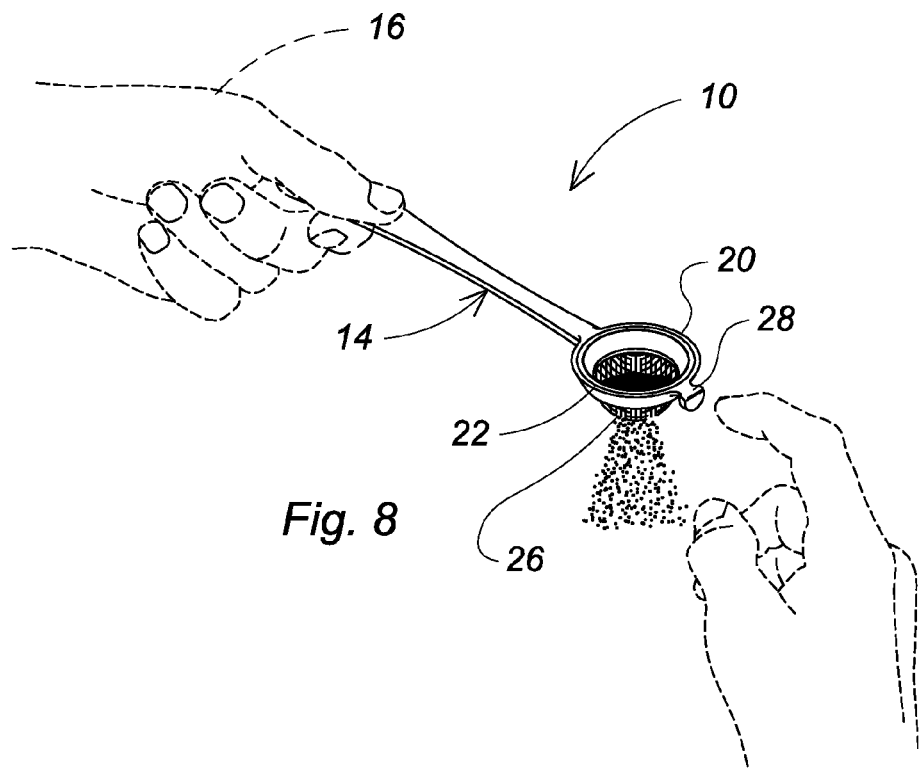
FIG. 8 is a perspective view showing a tab on the spoon being tapped from the side.
Figure 9:
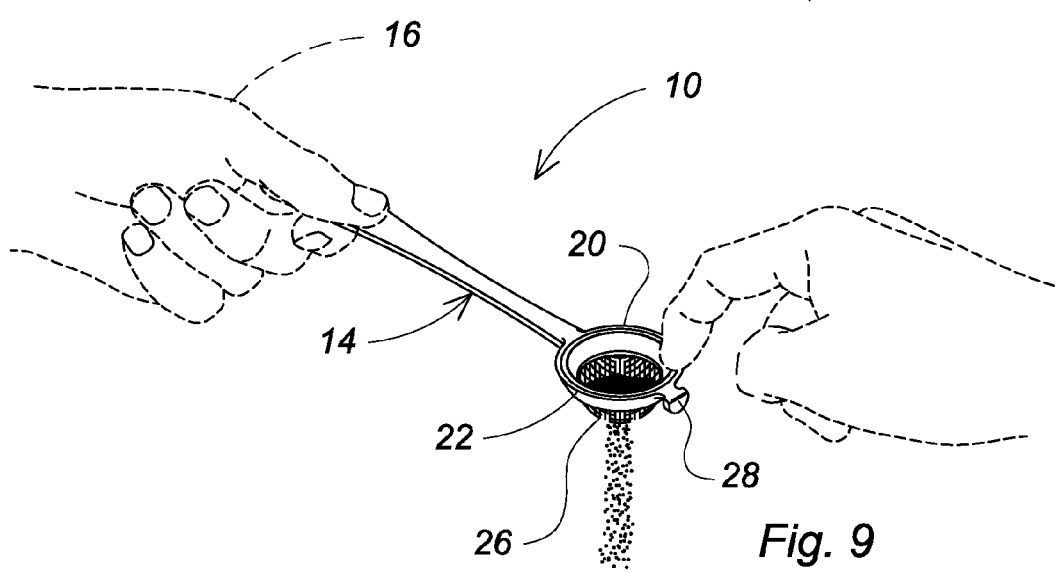
FIG. 9 is a perspective view showing the tab being tapped on top.

A tab 28 is formed on collar 20 for use in sifting material out of sifter body 22 in a controlled manner. As shown in FIG. 8, when tab 28 is tapped on the side, the material is distributed over a broad area and when tab 28 is tapped on top which may be flattened for that purpose, the material is dropped in a more concentrated manner. Tab 28 may be used as a ledge for resting spoon 10 on the open end of a spice jar and when tab is formed as a hook it may be used to hang spoon 10 on the edge of a cup, glass or bowl.

In use, when spoon 10 is a standard measuring spoon size, spoon 10 can function as a true measuring spoon and, in some case, save the user an extra step. Spoon 10 can be used to sprinkle fine particles of consumables such as paprika on deviled eggs, powdered sugar on brownies and other baked goods, sugar on top of strawberries, decorative sugars and decorations on cutout cookies. Nutmeg, cocoa or cinnamon can be sprinkled on top of hot drinks (like coffee or cocoa) or cold drinks (like eggnog or iced coffee) and dill or dried thyme can be sprinkled on entrees for a splash of color and brightness, not to mention added flavor. With precise measuring and/or application, there is no mess and no waste; spoon 10 is sanitary and unused (and uncontaminated) spices can be returned to the jar.

When sifter body 22 snaps out of collar 20, a user can select a sifter body 22 with the right size mesh 26. For instance, with a strong spice like paprika or nutmeg, a user may want to use a sifter body with the finest mesh bowl. For decorating sugars and powdered sugar, a medium mesh bowl 26 may be selected while for herbs, the mesh bowl with the largest mesh 26 may be best.

Turning to FIG. 10, measuring cup 12 like spoon 10 includes a sifter body 22 in the form of an open ended container 30 with apertures 18 in the bottom designed to distribute particulate materials placed in the sifter body. Cup 12 has a tab 28 opposite to handle 14. Handle 14 is attached to the outside of container 30 and tab 28 is attached to container 30 at or near its open end. In use, as with spoon 10, tab 28 may be used for more precise and controlled dispersing of material placed in cup 12.

In view of the above, it will be seen that the objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A material dispenser for dispensing fine particulate material comprising a sifter body attached to a handle, said handle having a first end configured to be grasped by a user's hand and a second end terminating in a collar with sloping sidewalls, said sifter body having sloping sidewalls and a bottom with openings designed to distribute particulate material placed in the sifter body, said sifter body detachably suspended in the sloping sidewalls of the collar by the sloping sidewalls of the sifter body, said sifter body further having a tab at a top edge, said material dispenser distributing particulate material placed in the sifter body through the openings in the bottom of the sifter body in a selected pattern over a designated surface when tapped on the tab by a user.

2. The material dispenser of claim 1 wherein the sifter body is a measuring cup.

3. The material dispenser of claim 1 wherein the sifter body is a measuring spoon.

4. A measuring spoon for dispensing fine particulate material comprising a handle with a first end configured to the grasped by a user's hand and a second end terminated in a collar with sloping sidewalls, a sifter body with sloping sidewalls detachably suspended in the sloping sidewalls of the collar, said sifter body having a bottom formed as a mesh bowl designed to distribute particulate material placed in the sifter body, said sifter body further having a tab along an edge of the collar, said material dispenser distributing particulate material placed in the sifter body through the mesh bowl in a selected pattern over a designated surface when tapped on the tab by a user.

5. The measuring spoon of claim 4 wherein the sloping sidewalls of the sifter body snaps in and out of the sloping sidewalls of the collar.

6. The measuring spoon of claim 5 further including a plurality of sifter bodies having mesh bowls with different sized mesh.

7. A measuring spoon for dispensing fine particulate material comprising a handle with a first end configured to the grasped by a user's hand and a second end terminated in a collar with sloping sidewalls, a sifter body with sloping sidewalls detachably suspended in the sloping sides of the collar, said sifter body having a bottom formed as a mesh bowl designed to distribute particulate material placed in the sifter body and said sloping sidewalls of the sifter body formed as a ring portion about an open end by which sifter body is supported in the collar, said sifter body further having a tab along an edge of the collar, said material dispenser distributing particulate material placed in the sifter body through the mesh bowl in a selected pattern over a designated surface when tapped on the tab by a user.

8. The measuring spoon of claim 7 where the sloping sidewalls formed in the ring portion and the sloping sidewalls of the collar into which sifter body is seated and detachably suspended are frustoconical sections.

9. The measuring spoon of claim 7 wherein the handle and sifter body are formed of stainless steel.

10. The measuring spoon of claim 7 wherein the measuring spoon is a standard measuring spoon size such that it can function as both a true measuring spoon and as a sifter.

* * * * *